US011639305B2

(12) United States Patent
Golyatin et al.

(10) Patent No.: US 11,639,305 B2
(45) Date of Patent: May 2, 2023

(54) APPARATUS AND METHOD FOR MOLTEN GLASS FLOW CONTROL ALONG AN ISOPIPE WEIR

(71) Applicant: Corning Incorporated, Corning, NY (US)

(72) Inventors: Vladislav Yuryevich Golyatin, Avon (FR); George Clinton Shay, Hardy, VA (US); William Anthony Whedon, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 246 days.

(21) Appl. No.: 16/540,720

(22) Filed: Aug. 14, 2019

(65) Prior Publication Data

US 2019/0367401 A1    Dec. 5, 2019

Related U.S. Application Data (62) Division of application No. 14/784,840, filed as application No. PCT/US2014/035844 on Apr. 29, 2014, now Pat. No. 10,421,682.

(60) Provisional application No. 61/817,545, filed on Apr. 30, 2013.

(51) Int. Cl.
    *C03B 17/06*    (2006.01)
    *C03B 17/02*    (2006.01)
    *B32B 17/06*    (2006.01)

(52) U.S. Cl.
    CPC ............ *C03B 17/064* (2013.01); *B32B 17/06* (2013.01); *C03B 17/02* (2013.01); *B32B 2419/00* (2013.01); *B32B 2457/00* (2013.01);
    *B32B 2457/20* (2013.01); *B32B 2605/08* (2013.01); *Y02P 40/57* (2015.11)

(58) Field of Classification Search
    None
    See application file for complete search history.

(56) References Cited

U.S. PATENT DOCUMENTS

| | | |
|---|---|---|
| 3,338,696 A | 8/1967 | Dockerty |
| 3,438,518 A | 4/1969 | Josef |
| 3,673,049 A | 6/1972 | Giffen et al. |
| 3,723,082 A | 3/1973 | Knowles et al. |
| 4,204,027 A | 5/1980 | Simon |
| 4,214,886 A | 7/1980 | Shay et al. |

(Continued)

FOREIGN PATENT DOCUMENTS

| | | |
|---|---|---|
| CA | 883941 A | 10/1971 |
| CN | 102311218 A | 1/2012 |

(Continued)

OTHER PUBLICATIONS

English Translation of Chinese Fourth Office Action dated Nov. 12, 2018; 8 Pages; Chinese Patent Office.

(Continued)

*Primary Examiner* — Lisa L Herring
(74) *Attorney, Agent, or Firm* — Daniel J. Greenhalgh (57) ABSTRACT

An apparatus for fusion draw glass manufacture, including: at least one isopipe having at least one weir; and a fluid discharge member in proximity to the at least one weir of the at least one isopipe, the fluid discharge member is in fluid communication with a remote fluid source. Methods of making and using the apparatus are also disclosed.

9 Claims, 4 Drawing Sheets

(56) References Cited

U.S. PATENT DOCUMENTS

| | | |
|---|---|---|
| 4,872,238 A | 10/1989 | Crotts et al. |
| 4,988,847 A | 1/1991 | Argos et al. |
| 5,100,452 A | 3/1992 | Dumbaugh |
| 6,990,834 B2 | 1/2006 | Pitbladdo |
| 6,997,017 B2 | 2/2006 | Pitbladdo |
| 7,155,935 B2 | 1/2007 | Pitbladdo |
| 7,201,965 B2 | 4/2007 | Gulati et al. |
| 7,514,149 B2 | 4/2009 | Bocko et al. |
| 7,681,414 B2 | 3/2010 | Pitbladdo |
| 8,006,517 B2 | 8/2011 | Pitbladdo |
| 8,007,913 B2 | 8/2011 | Coppola et al. |
| 8,042,361 B2 | 10/2011 | Pitbladdo |
| 8,056,365 B2 | 11/2011 | Pitbladdo |
| 8,397,536 B2 | 3/2013 | Delia et al. |
| 8,646,291 B2 | 2/2014 | Coppola et al. |
| 9,193,617 B2 | 11/2015 | Kersting et al. |
| 2003/0029199 A1 | 2/2003 | Pitbladdo |
| 2004/0154336 A1 | 8/2004 | Pitbladdo |
| 2004/0197575 A1 | 10/2004 | Bocko et al. |
| 2007/0116913 A1 | 5/2007 | Kimura et al. |
| 2007/0190340 A1* | 8/2007 | Coppola ............ C03C 17/02 428/432 |
| 2011/0289969 A1 | 12/2011 | Delia et al. |
| 2013/0102228 A1 | 4/2013 | Tsuda et al. |
| 2016/0159677 A1 | 6/2016 | Coppola et al. |

FOREIGN PATENT DOCUMENTS

| | | |
|---|---|---|
| CN | 202164225 U | 3/2012 |
| CN | 102906036 A | 1/2013 |
| JP | 02149438 A | 6/1990 |
| WO | 2004069757 A2 | 8/2004 |
| WO | 2011077734 A1 | 6/2011 |
| WO | 2013016157 A1 | 1/2013 |

OTHER PUBLICATIONS

International Search Report of the International Searching Authority; PCT/US2014/035844; dated Jul. 22, 2014; 5 Pages; European Patent Office.

Dictionary.com, "Fluid" definition http://www.dictionary.com/browsefluid, Mar. 2017.

JP02149438A English Translation Performed by FLS, Inc., Sep. 2016.

* cited by examiner

APPARATUS AND METHOD FOR MOLTEN GLASS FLOW CONTROL ALONG AN ISOPIPE WEIR

CROSS REFERENCE TO RELATED APPLICATIONS

This application claims the benefit of priority under 35 U.S.C. § 120 of U.S. Non- Provisional application Ser. No. 14/784,840, filed on Oct. 15, 2015, which claims the benefit of priority under 35 U.S.C. § 371 of International Application Serial No. PCT/US14/35844, filed on Apr. 29, 2014, which claims the benefit of priority under 35 U.S.C. § 119 of U.S. Provisional application Ser. No. 61/817,545, filed on Apr. 30, 2013, the contents of all of which are relied upon and incorporated herein by reference in their entirety.

The entire disclosure of any publication or patent document mentioned herein is incorporated by reference.

CROSS-REFERENCE TO RELATED APPLICATIONS

This application is related to commonly owned and assigned U.S. Pat. No. 8,007,913, issued Aug. 30, 2011, to Coppola, et al., entitled "Laminated Glass Articles and Methods of Making Thereof"; U.S. Ser. No. 13/479,701, filed May 24, 2012, to Coppola, et al., entitled "Apparatus and Method for Control of Glass Streams in Laminate Fusion"; and U.S. Ser. No. 61/676,028, filed Jul. 26, 2012, to Kersting, et al., entitled "Refractory Liner Structure and Use in Glass Fusion Draw"; and U.S. Ser. No. 61/678,218, filed Jul, 8, 2012, to Coppola, et al., entitled "Method and Apparatus for Laminate Fusion," which content is relied upon and incorporated herein by reference in its entirety, but does not claim priority thereto.

BACKGROUND

The disclosure generally relates to an apparatus and method for fusion glass manufacture or laminate fusion glass manufacture.

SUMMARY

The disclosure provides an apparatus and method for localized flow control of the molten glass mass (i.e., glass stream(s)) at or along the weirs of an isopipe using a fluid stream projection from a source onto the molten glass.

BRIEF DESCRIPTION OF DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus and the disclosed apparatus and method of using the apparatus provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

DEFINITIONS

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Optional" or "optionally" means that the subsequently described event or circumstance can or cannot occur, and that the description includes instances where the event or circumstance occurs and instances where it does not.

"Consisting essentially of" in embodiments can refer to, for example:

An apparatus for fusion draw glass manufacture, consisting essentially of:
one or a plurality of isopipes, each isopipe having at least one weir; and
one or a plurality of fluid discharge members in proximity to the at least one weir of the isopipe, the fluid discharge member or members being in fluid communication with a remote fluid source.

A method for controlling the glass streams in fusion glass manufacture in the abovementioned apparatus, consisting essentially of:
flowing molten glass over the at least one weir of the at least one isopipe; and
discharging the fluid from the fluid discharge member in proximity to the at least one weir of the at least one isopipe onto the molten glass flowing over the at least one weir of the isopipe.

A method for controlling the glass streams in fusion glass manufacture in the abovementioned apparatus, consisting essentially of:
characterizing the thickness defect profile of a fusion glass manufacture product by measuring the glass thickness across the draw and down the draw;

determining at least one fluid discharge configuration that remedies, that is, partially or substantially reduces the thickness defect profile, wherein the at least one fluid discharge configuration includes at least one of:
  the fluid flow rate and relative temperature difference between the fluid and the glass stream;
  the orientation of the at least one fluid discharge member with respect to the inlet and compression ends of the isopipe;
  the location or proximity of the at least one fluid discharge member with respect to the inlet end and compression end of the isopipe;
  the geometry of the at least one fluid discharge member;
  or combinations thereof; and
discharging a gaseous fluid from the fluid discharge member to the at least one weir of the at least one isopipe onto the molten glass flowing over the at least one weir of the isopipe in accordance with the characterized thickness defect profile and the determined at least one fluid discharge configuration.

The apparatus and the method of using the apparatus of the disclosure can include the components or steps listed in the claim, plus other components or steps that do not materially affect the basic and novel properties of the compositions, articles, apparatus, or methods of making and use of the disclosure, such as a particular apparatus configuration, particular additives or ingredients, a particular agent, a particular structural material or component, a particular irradiation or temperature condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The apparatus and methods of the disclosure can include any value or any combination of the values, specific values, more specific values, and preferred values described herein, including explicit or implicit intermediate values and ranges.

In a traditional fusion draw process, glass stream or layer thickness deviations can be corrected by mechanical adjustments at the root or lower tip of the isopipe and can affect the bulk glass but without discriminating the individual glass layers (see for example, U.S. Pat. No. 3,338,696, to Dockerty). In a multi-layer lamination, the thickness of each glass layer is preferably controlled to specified tolerances. Thus, an additional method to independently control the thickness properties or thickness profile of each of the glass layers would be valuable.

In embodiments, the disclosure provides an apparatus and method for controlling the glass streams in laminate fusion glass manufacture. More particularly, the disclosure provides an apparatus and method for control of molten glass mass flow properties along an isopipe weir in a fusion draw process by selectively contacting the overflow molten glass mass with a fluid source at a temperature other than (e.g., cooler or hotter) the temperature of the molten glass mass.

In the laminate double-fusion forming (LDF) process, both weirs of the upper clad isopipe can be contacted with or made accessible to, for example, the highly localized heating or cooling sources. These sources can be used to create localized temperature perturbations in the glass along the line of the weir.

An example source is a single air jet that blows, for example, localized cold air on top of the glass flowing atop of or over a weir. In embodiments, an array of air jets, or like source and dispense or discharge member instrumentalities, can be distributed along the weir line of either or both weirs. If each source such as an air jet's characteristic "width" is not too large, then an array of air jets can be used to alter the glass mass flow distribution over a particular weir in a predictable way and as called for in process control.

The disclosure relates primarily to laminate fusion draw sheet making, in particular, three layer thickness control. However, one skilled in the art will recognize the disclosure can also be readily applied to other draw processes for a variety of purposes.

In embodiments, the disclosure provides a fusion draw apparatus having an isopipe and a fluid source dispenser or discharger in proximity to at least one weir of at least one isopipe.

In embodiments, the fluid source can be configured to discharge fluid onto the surface of the molten glass overflowing the weir. The discharged fluid can locally change the temperature and the flow properties of the molten glass overflowing the weir. The changed flow properties can be used to change the thickness of the molten glass stream overflowing the weir and consequently the thickness of the respective glass layer or layers in the resulting fusion draw glass ribbon and sheet of the resulting laminate glass ribbon.

In embodiments, each fluid source delivery member, such as a tube, can be, for example, independently or dependently oriented, moved, or adjusted, with respect to the other tubes in an array of tubes. In embodiments, the tubes delivering the fluid source to the surface of the glass overflowing the isopipe weir can be used to control the temperature properties of the glass stream and the resulting thicknesses properties of the resulting glass ribbon.

In embodiments, the fluid source delivery member or discharger can be oriented at the same or different directions with respect to the surface or edge of the weir. In embodiments, the fluid source delivery or discharger member can be oriented or reoriented manually or robotically. In embodiments, the fluid source delivery member or discharger can be oriented or reoriented remotely, for example, by mechanical means or robotic means. In embodiments, the fluid source delivery member or discharger can be, for example, at least one tube, such as a plurality of tubes or an array of tubes. In embodiments, each tube in a plurality of tubes can be oriented individually or independently of the other tubes. In embodiments, each tube in a plurality of tubes can be oriented substantially identically to the other tubes in an array of tubes and can be situated, for example, in a line or linearly, and in close proximity to at least one weir of an isopipe, such as from about 0.1 mm to about 20 mm, and like values, including intermediate values and ranges.

In embodiments, the disclosure provides an apparatus for fusion draw glass manufacture, comprising:
  at least one isopipe having at least one weir; and
  a fluid discharge member or discharger in proximity to the at least one weir of the at least one isopipe, the fluid discharge member or discharger is in fluid communication with a remote fluid source.

In embodiments, the fluid source can be, for example, a source of at least one of a gas, a liquid, a solid, radiation, or combinations thereof.

In embodiments, the gas can be, for example, a heated or cooled gas such as air, nitrogen, argon, and like gases, or combinations thereof. The liquid can be, for example, a heated or cooled liquid such as water, an alcohol, a glycol, and like liquids, or combinations thereof. The solid can be, for example, a heated or cooled solid such as a wax, a talc, a powder, dry ice ($CO_2$) particles or dust, and like solids, or combinations thereof. The radiation can be, for example, any actinic source of an energetic beam such as UV, visible, IR, X-ray, microwave, and like sources, or combinations thereof. One source of an energetic beam is a laser or combination of lasers.

In embodiments, the fluid discharge member delivers a heated fluid, a cooled fluid, or combinations thereof, to the surface area of a molten glass mass (i.e., the work piece) stream overflowing the at least one weir.

In embodiments, the fluid discharge can be accomplished selectively with respect to, for example, the position, such as the location, on the surface of molten glass overflowing the weir, and the relative orientation, that is, the direction or directions of the fluid discharge onto the surface of molten glass overflowing the weir of the isopipe.

In embodiments, the fluid source can include a fluid discharge member, such as tube, nozzle, hose, and like structures, or combinations thereof. The fluid discharge member communicates the temperature conditioned fluid from the fluid source to the surface point or area of the molten glass overflowing the weir. In embodiments, a fluid discharge member can be oriented in different directions with respect to the surface or edge of the weir. In embodiments, the fluid discharge member can be oriented or reoriented manually or robotically using, for example, mechanical linkages situated inside or outside of the heated enclosure, such as a muffle, a doghouse, or both, surrounding the isopipe(s). In embodiments, the fluid discharge member can be oriented or reoriented remotely. In embodiments, the fluid discharge member can be, for example, at least one tube, such as a single tube, a plurality of tubes, or an array of tubes. In embodiments, each tube in a plurality of tubes can be oriented individually or independently of the other tubes. In embodiments, each tube in a plurality of tubes can be coordinatively oriented substantially identically or in tandem (e.g., a group of two or more fluid discharge member arranged side-by-side or acting in conjunction with) to the other tubes in an array of tubes. The array of tubes can situated, for example, in a line or linearly, and in close proximity to the glass stream overflowing at least one weir of an isopipe. The close proximity of fluid discharge member with respect to at least one weir of an isopipe can be, for example, from about 0.1 cm to about 20 cm, from about 0.2 cm to about 10 cm, from about 0.3 cm to about 5 cm, from about 0.5 cm to about 2 cm, and like close proximity dimensions, including intermediate values and ranges.

In embodiments, each discharge member such as the tubes in array of tubes can be, for example, independently or dependently moved or adjusted with respect to the other tubes in an array. In embodiments, the tubes delivering the fluid to the surface of the glass overflowing the isopipe weir can be used to control the temperature properties of the glass stream, and consequently, the resulting thicknesses properties of the resulting glass ribbon, including the thickness of individual layers in a laminate glass ribbon having two or more layers.

In embodiments, the fluid discharge member discharges a fluid from the fluid source to at least one location on the surface of molten glass overflowing the at least one weir, for example, a single location, two locations, a continuous line, a discontinuous line, a plurality of similar locations, a plurality of dissimilar locations, or combinations thereof, on the surface of molten glass overflowing the at least one weir.

In embodiments, the fluid discharge member discharges a fluid in at least one direction or orientation on the surface of molten glass overflowing the at least one weir, for example, a single direction or orientation, two different directions or different orientations, or a plurality of different directions or different orientations on the surface of molten glass overflowing the at least one weir.

In embodiments, the fluid discharge member discharges a fluid that can, for example, locally change: the temperature properties of the molten glass overflowing the weir; the flow properties of the molten glass overflowing the weir; the thickness properties of the molten glass stream overflowing the weir; or a combination thereof.

In embodiments, the fluid discharge member discharges a fluid stream selected from at least one of: a point; a small spot; a large spot; an oval, a non-symmetrical ellipsoid or egg shape profile, a parabola, an hyperbola, a triangle or wedge shaped profile, or combinations thereof.

In embodiments, the fluid discharge member can be, for example, a tube, a pipe, an air knife, an air curtain, and like members, or combinations thereof.

In embodiments, the disclosed apparatus can further comprise, for example, an enclosure that substantially surrounds the at least one isopipe having at least one weir and the fluid discharge member, for example, a muffle, a doghouse, and like enclosures, or combinations thereof.

In embodiments, the disclosure provides a method for controlling the glass streams in fusion glass manufacture in the above mentioned apparatus, comprising, for example:
flowing molten glass over the at least one weir of the at least one isopipe; and
discharging a fluid from the fluid discharge member or discharger situated in proximity to the at least one weir of the at least one isopipe onto the molten glass flowing over the at least one weir of the isopipe.

In embodiments, discharging a fluid from the fluid discharge member can be accomplished, for example, selectively to specified positions atop the weir overflow, such as one or more locations, spots, lines, regions, or combinations thereof.

In embodiments, discharging a fluid from the fluid discharge member can be accomplished, for example, by discharging an array of fluid discharge members that have the same spatial orientation and direction.

In embodiments, discharging a fluid from the fluid discharge member can be accomplished, for example, by discharging an array of fluid discharge members having at least one fluid discharge member having a different spatial orientation, direction, or both, compared to the other fluid discharge members in the array.

In embodiments, the disclosure provides a method for controlling the glass streams in fusion glass manufacture in the abovementioned apparatus, comprising:
characterizing the thickness defect profile of a fusion glass manufacture product;
determining at least one fluid discharge configuration, for example, experimentally, modelling, simulation, or a combination thereof, which configuration remedies the thickness defect profile, and the at least one fluid discharge configuration comprises at least one of:

the fluid flow rate and relative temperature difference between the fluid and the glass stream;

the orientation of the at least one fluid discharge member with respect to the inlet and compression ends of the isopipe;

the location or proximity of the at least one fluid discharge member with respect to the inlet and compression ends of the isopipe;

the geometry of the at least one fluid discharge member, for example, a fluid discharger having a nozzle or like tip having, for example, a circular, a flared, an angled, a slotted, and like opening geometries, or combinations thereof;

or combinations thereof; and discharging the fluid from the fluid discharge member to the at least one weir of the at least one isopipe onto the molten glass flowing over the at least one weir of the isopipe in accordance with the characterized thickness defect profile and the determined at least one fluid discharge configuration.

The disclosed apparatus and method are advantaged, for example, by providing the ability to:

independently alter the glass flow distribution that flows over either the left or the right weir of a fusion isopipe (such a capability enables the thickness of the three layers or higher multi-layers of a laminated glass sheet product to be independently controlled);

create complex thickness patterns (e.g., clad-layers only, and where right side clad thickness is asymmetrical or not a mirror image of left side clad thickness);

alter the molten glass mass flow at the ends of a single fusion isopipe to influence, for example, bead thickness, sheet width variation to combat isopipe sag, or a combination thereof; and alter the molten glass mass flow over the quality area of a single fusion isopipe to control thickness of the single layer provides an alternative or compliment to a known mechanical thickness control method (see U.S. Pat. No. 3,338,696, to Dockerty, supra).

Laminated glass sheets can have, for example, three layers consisting of an inner core glass layer, and two outer clad glass layers. The core glass is sourced from a single isopipe where the glass flow on each side of the isopipe fuse at the root or base of the isopipe to form one homogenous glass layer. The clad glass is also sourced from one isopipe but the glass flow on each side of the isopipe is deposited on the outer surface of the glass layer flowing on the same side of the core isopipe to form two layers on the outside of the final laminated glass sheet (see FIG. 1).

The thickness (i.e., average value and uniformity across the sheet) of each glass layer is preferably controlled to specified tolerances. In embodiments, the present disclosure provides a method that uses a single isopipe, and a single layer fusion forming process to control the overall or total thickness of the laminated sheet in combination with a new device(s) and method that allows the thickness of each of the two clad glass layers to be controlled independently.

Generally glass thickness properties are very stable in the vertical or down-the-draw direction. Thickness uniformity or control address in the present disclosure is, in embodiments, directed to the less stable and less easily controlled horizontal or across-the- draw direction.

EXAMPLE(S)

The following examples serve to more fully describe the manner of using the above-described disclosure, and to further set forth best modes contemplated for carrying out various aspects of the disclosure. These examples do not limit the scope of this disclosure, but rather are presented for illustrative purposes. The working example(s) further describe(s) the apparatus and method of using the apparatus of the disclosure.

Figure 1A:
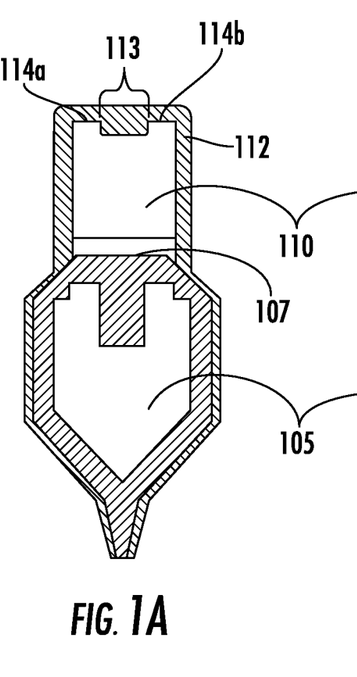
FIGS. 1A and 1B show, respectively, cross-section and side-view schematics of a PRIOR ART laminated glass forming apparatus and process.
Figure 1B:
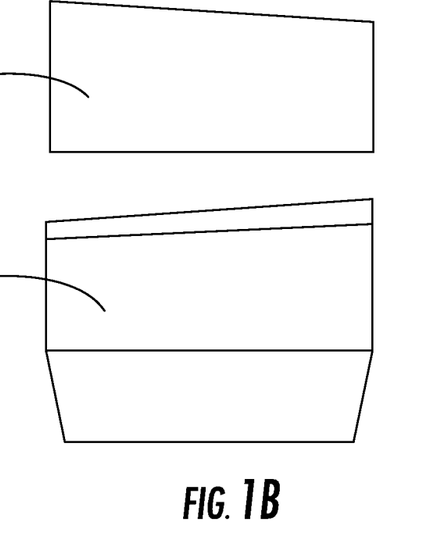

Referring to the Figures, FIGS. 1A and 1B show, respectively, a cross section (FIG. 1A) and a side view (FIG. 1B) of laminated glass forming apparatus and process having a core isopipe (105) surmounted by a clad isopipe (110). The core isopipe (105) provides and directs the core glass stream (107). The clad isopipe (110) provides and directs the clad glass stream (112) onto the core glass stream (107). The clad isopipe (110) includes a trough (113) and a first weir (114a) and a second weir (114b), which weirs can act as partial dams or gates that can permit control or regulation of the molten clad glass stream (112) over flow and the thickness of the resulting respective clad layers.

Figure 2:
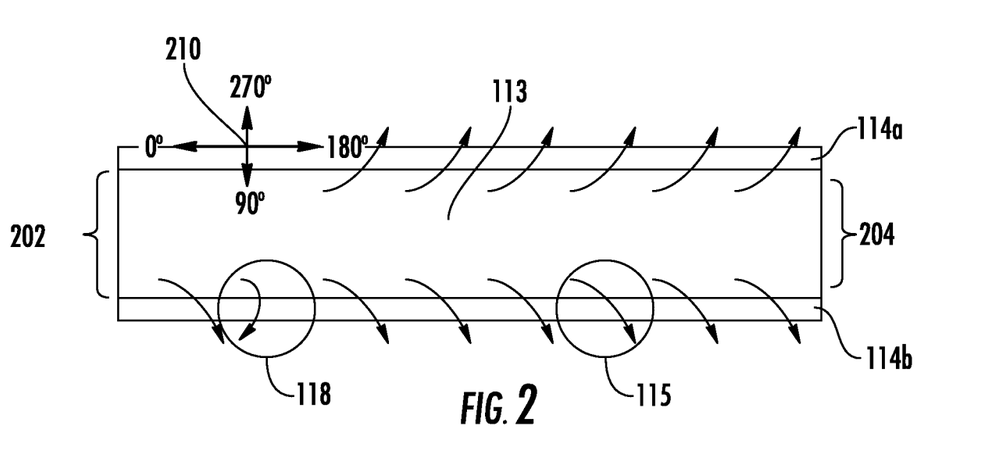
FIG. 2 shows a top view schematic of a clad isopipe and its weirs.

FIG. 2 shows a top view schematic of the clad isopipe trough (113). Molten glass flows generally from the left inlet (202) side to right compression (204) side of the trough (113), although as a fluid element or discharger, such as an air jet stream, provides a glass stream path (115), approaches either weir the molten glass trajectory, in cooling, tends to become abbreviated or shortened so as to approach a more perpendicular orientation or trajectory such as a glass stream path (118). The directional axes (0°, 90°, 180°, 270°) in the upper left of the figure provide the air-stream angle (210) convention as the discharger projects into the plane of the glass stream surface overflowing the weirs (114a; 114b).

Figure 3A:
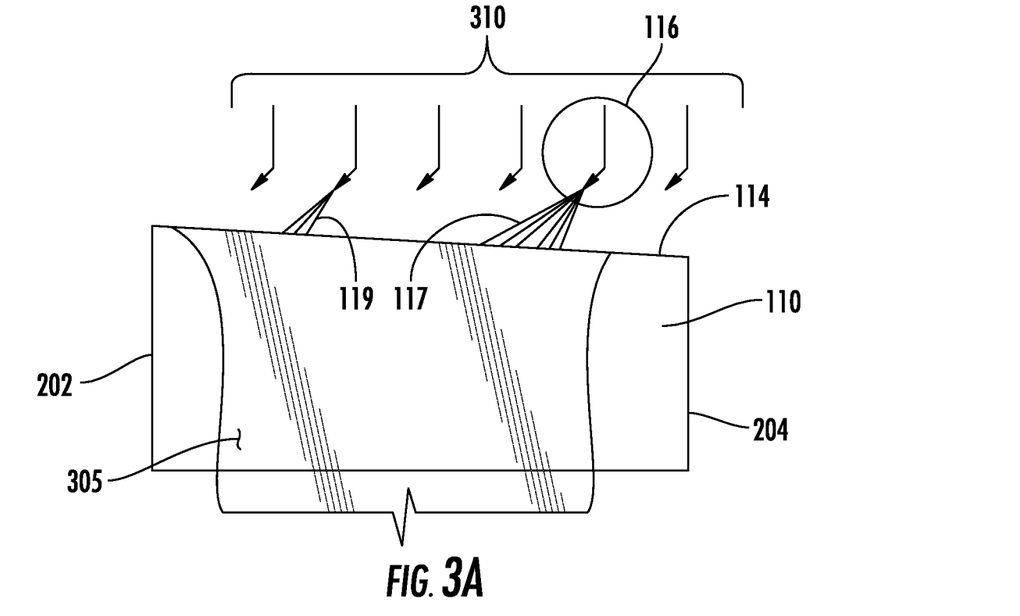
FIGS. 3A and 3B show respectively, a side view and top view of an exemplary fluid or air jet arrangement or fluid jet array directed over a weir of a core or clad isopipe.
Figure 3B:
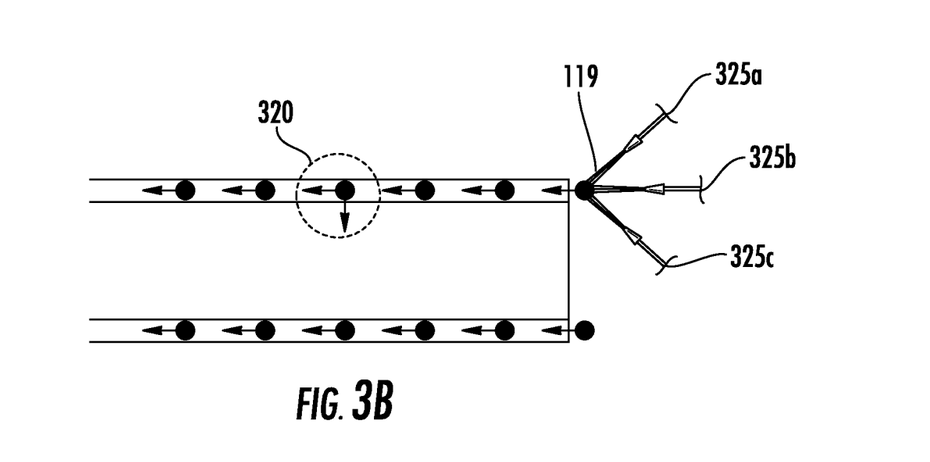

FIGS. 3A and 3B shows aspects of an example of the disclosed apparatus and method having an air jet arrangement of dischargers directed over a weir of a clad isopipe (110). FIG. 3A is a side view of the clad pipe showing an array of air jets (310) comprised of one or more tubes or nozzles that can be distributed, for example, along a top line running from the inlet (202) end to the compression (204) end of both weir surfaces (114). In embodiments, the fluid nozzle jet, or tube such as nozzle (116) can have broad (117) or narrow (119) contact pattern with the glass (305) surface. FIG. 3B is a top view showing alternative angular orientations for one tube (320) of the array at 0 degrees (pointing left or 9 o'clock), 90 degrees (pointing down or 6 o'clock), and 180 degrees (pointing right or 3 o'clock). In this example the tip of the air-jet is bent to form an angle that allows the air stream to hit the top surface of the molten glass at an angle less than, for example, 90 degrees but typically greater than, for example, 45 degrees. This particular arrangement allows each jet or tube of the array (310) to be aimed by varying, for example, the angle of rotation, the height of the tube above the glass surface, or both. Other types of jet source equivalents or variations that can be used can include, for example: hot-air jets; gasses other than air; radiation based heating or cooling sources, such as focused or collimated; and other tube spatial arrangements. Alternative exemplary nozzle angular orientations (e.g., 325a, 325b, 325c) and associated fluid streams (119) are available.

The fluid or air jet stream can act to cool the glass locally, for example, at the point or points of contact of the air stream with the glass, and thus reduce the glass mass flow that would follow the glass stream lines (see, e.g., FIG. 2 lines 115) from the point of contact to the point where the glass mass flow overflows the weir. In embodiments, where there is greater the cooling of the glass stream by the applied fluid stream the glass stream lines can become shorter, e.g., typically having greater viscosity, less flow, reduce flow length (see, e.g., FIG. 2, lines 118), and a greater cross-sectional thickness.

Figure 4:
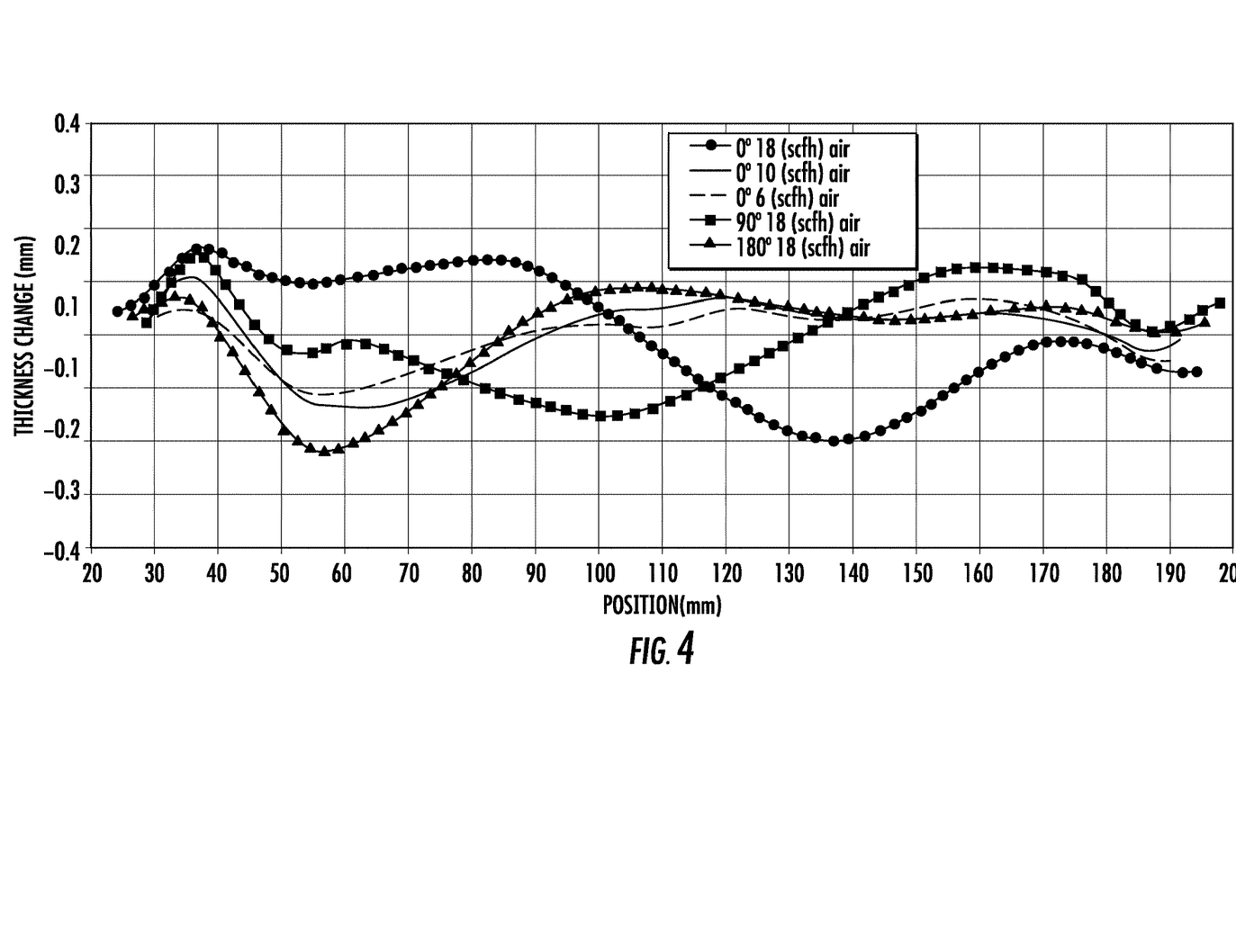
FIG. 4 is a graph that shows thickness change vs. fluid air-jet angular orientation as a function of fluid air jet flow rates.

FIG. 4 shows the relationship of thickness change vs. air stream angular orientation and air jet flow. Specifically, FIG. 4 graphically shows the effect of the air stream impact point, contact point, region of contact or impact, and the fluid (e.g., air) flow rate in standard cubic feet per hour (SCFH) on the thickness of a glass ribbon. In this scenario, one air jet with a bent-tip as described above (e.g., the air-stream angle to glass surface is about 60 degrees) was positioned (from 20 to 200 mm) over one weir (about mid-way between inlet end (left) and compression end (right)) of a small (about 254 mm wide) fusion isopipe. The air-stream angle (see FIG. 2, 210 for fluid source orientation convention with respect to the top view of the weir and analogous to a compass heading) was varied along with the air flow rate and the resulting glass sheet thickness was measured with a laser gauge. The nominal thickness of the glass sheet was about 2.8 mm so the maximum change of about 0.2 mm observed is nearly 7% of nominal. This is a relatively large range with respect to potential control capability.

The air-stream angle can change the location of maximum influence on thickness in a predictable way relative to the glass sheet. For example, reducing the air flow from an air jet tends to reduce the degree of "thinning" also in a predictable, monotonic way. The maximum influence position can also be changed by raising or lowering an air-jet (e.g., a tube) where raising the air-jet effectively reduces flow and cooling and decreases thickening, whereas lowering the air-jet increases flow and cooling and increases thickening.

Although not limited by theory, the following enumerated instances or situations describe conditions and methods that may or may not call for apparatus or system modification for controlling glass flow and thickness properties.

A first ideal situation is where the glass mass flow distribution over each of the four weirs (i.e., two weirs of the core pipe and two weirs of the clad pipe) is highly uniform and symmetric from left side to right side. This situation essentially calls for no system thickness adjustment or thickness adjustment method.

A second, less than ideal situation is where the ratio of clad glass to core glass on both sides of the fusion machine is everywhere the same, but where the combined thickness of all three layers varies from the isopipe inlet end to the isopipe compression end (and for example, with several undulations about a best fit line). This situation can use the conventional isopipe tilting method (see U.S. Pat. No. 3,338,696, to Dockerty, supra, or see for example, the abovementioned copending U.S. Ser. No. 61/678,218) to adjust the overall thickness as needed.

A third situation is similar to the second situation but where the ratio of clad to core glass is not the same on one side of the fusion machine relative to the other side. In this situation it is possible that adjustments of the "roll" or "cross-tilt" of either one or both isopipes may be enough to reduce the problem to the first or the second type.

In a fourth situation the ratio of clad to core glass varies smoothly from the isopipe inlet end to the compression end on both sides (and in the same way) of the isopipe. In this situation it is possible that adjustments of the "uptilt" or "downtilt" of either one or both of the isopipes may be enough to reduce the problem to the abovementioned first or second situations.

In a fifth situation, there can be a combination of the third and fourth situations, which fifth situation can be addressed with a combination of isopipe movements to again reduce the problem to the abovementioned first or second situations.

Finally for the more general, sixth situation, the problem of three layer thickness control, a method to control the overall thickness combined with a method to independently control the mass flow distribution on both sides of the clad isopipe can be used. If the thickness of the individual layers of a three layer glass sheet can be measured precisely enough, then a system such as shown in FIG. 3 can be used to adjust the mass flow distribution on both sides of the clad isopipe so that the resulting three layer thickness control problem reduces to any of the situations 1 to 5 described above. The "resolution" of the disclosed apparatus and method can be, for example, the highest frequency of thickness errors that the system can correct. The single tube responses from FIG. 4 are about 50 to 70 mm wide in the vicinity of their maximum impact. For the standard system (see U.S. Pat. No. 3,338,696, to Dockerty, supra) the characteristic width is nearly 254 mm wide. The smaller that this characteristic width is, the higher the inherent resolution. It is unlikely that thickness performance of the resulting three layer laminated glass sheet will be limited by an inability to control clad glass mass flow distribution to a suitably high degree of resolution.

In embodiments, the disclosure provides a method of forming a glass-glass laminate sheet comprising:
  flowing a first molten glass over a first weir of a first isopipe to form a first molten glass stream;
  flowing a second molten glass over a second weir of a second isopipe to form a second molten glass stream;
  forcing a fluid from a fluid discharge member in proximity to at least one of the first and second weirs such that the fluid is directed onto the respective molten glass stream; and
  fusing the first and second molten glass streams to each other to form a multilayer glass-glass laminate sheet.

In embodiments, the disclosure provides for a use of the multilayer glass-glass laminate sheet, made by the above preceding method, as a cover glass or a glass backplane in an electronic device.

In embodiments, the disclosure provides for a use of the multilayer glass-glass laminate sheet, made by the above preceding method, in an LCD display, an LED display, a computer monitor, an automated teller machine (ATM), a mobile telephone, a personal media player, a tablet computer, a photovoltaic component, an architectural glass pane, an automotive glazing, a vehicular glass, a commercial appliance, a household appliance, or a solid state lighting article.

In embodiments, the disclosure provides for a glass article formed using the apparatuses or methods described herein to be used for a variety of applications including, for example, for cover glass or glass backplane applications in consumer or commercial electronic devices including, for example, LCD and LED displays, computer monitors, and automated teller machines (ATMs); for touch screen or touch sensor applications; for portable electronic devices including, for example, mobile telephones, personal media players, and tablet computers; for photovoltaic applications; for architectural glass applications; for automotive or vehicular glass applications; for commercial or household appliance applications; or for lighting applications including, for example, solid state lighting (e.g., luminaires for LED lamps).

The disclosure has been described with reference to various specific embodiments and techniques. However, it should be understood that many variations and modifications are possible while remaining within the scope of the disclosure.

What is claimed is:

1. A method for controlling glass streams in fusion glass manufacture in an apparatus comprising: at least one isopipe having at least one weir and a fluid discharge nozzle in proximity to the at least one weir of the at least one isopipe, the fluid discharge member being in fluid communication with a remote fluid source, the method comprising:
flowing molten glass over the at least one weir of the at least one isopipe; and
discharging a fluid from the fluid discharge nozzle onto the molten glass flowing over the at least one weir of the at least one isopipe, the fluid discharge nozzle positioned in proximity to the at least one weir of the at least one isopipe,
wherein the fluid discharge nozzle has a spatial orientation and direction that is adjustable to change a contact location of the fluid on the molten glass flowing over the at least one weir of the at least one isopipe relative to the at least one weir, and
wherein the fluid discharge nozzle discharges the fluid based on thickness characteristics of the molten glass flowing over the at least one weir of the at least one isopipe.

2. The method of claim 1, wherein discharging a fluid from the fluid discharge nozzle situated above or atop the at least one weir overflow is accomplished selectively to at least one of: a specified location, a spot, a line, a region, or combinations thereof.

3. The method of claim 1, wherein discharging a fluid from the fluid discharge nozzle comprises discharging a fluid from an array of fluid discharge nozzles each having a respective spatial orientation and direction that is adjustable, the array of fluid discharge nozzles configured to have the same spatial orientation and direction.

4. The method of claim 1, wherein discharging a fluid from the fluid discharge nozzle comprises discharging a fluid from an array of fluid discharge nozzles each having a respective spatial orientation and direction that is adjustable, the array of fluid discharge nozzles configured to have at least one fluid discharge nozzle having a different spatial orientation and direction compared to the other fluid discharge nozzle in the array.

5. The method of claim 1, wherein the fluid discharge nozzle may be oriented in different directions with respect to a surface or edge of the at least one weir of the at least one isopipe.

6. A method for controlling glass streams in fusion glass manufacture in an apparatus comprising: at least one isopipe having at least one weir and a fluid discharge member in proximity to the at least one weir of the at least one isopipe, the fluid discharge member being in fluid communication with a remote fluid source, the method comprising:
characterizing a thickness defect profile of a fusion glass manufacture product;
determining at least one fluid discharge configuration that remedies the thickness defect profile, wherein the at least one fluid discharge configuration comprises at least one of:
a fluid flow rate and relative temperature difference between a fluid and at least one of the glass streams;
an orientation of the fluid discharge member with respect to an inlet end and a compression end of the at least one isopipe;
the location or proximity of the fluid discharge member with respect to the inlet and compression ends of the at least one isopipe;
a geometry of the fluid discharge member;
or combinations thereof; and
discharging a fluid from the fluid discharge member to the at least one weir of the at least one isopipe onto the molten glass flowing over the at least one weir of the at least one isopipe in accordance with the characterized thickness defect profile and the determined at least one fluid discharge configuration.

7. A method of forming a glass-glass laminate sheet comprising:
flowing a first molten glass over a first weir of a first isopipe to form a first molten glass stream;
flowing a second molten glass over a second weir of a second isopipe to form a second molten glass stream;
forcing a fluid from a first fluid discharge nozzle in proximity to the first weir such that the fluid is directed onto the first molten glass stream flowing over the first weir of the first isopipe;
forcing the fluid from a second fluid discharge nozzle in proximity to the second weir such that the fluid is directed onto the second molten glass stream flowing over the second weir of the second isopipe; and
fusing the first and second molten glass streams to each other to form a multilayer glass-glass laminate sheet,
wherein each of the first and second fluid discharge nozzles has a spatial orientation and direction that is independently adjustable to change a contact location of the fluid on the first and second molten glass streams flowing over the first and second weirs of the first and second isopipes.

8. The method of claim 7, wherein the first and second fluid discharge nozzles each discharge the fluid based on thickness characteristics of the molten glass flowing over first and second weirs of the first and second isopipes, respectively.

9. The method of claim 7, wherein the first and second fluid discharge nozzles may each be oriented in different directions with respect to a surface or edge of the first and second weirs of the first and second isopipes, respectively.

* * * * *